US012614208B2

(12) United States Patent (10) Patent No.: US 12,614,208 B2
Hu et al. (45) Date of Patent: Apr. 28, 2026

(54) SYSTEMS AND METHODS FOR GENERATING AND UTILIZING SYNTHETIC DATA

(71) Applicant: Zscaler, Inc., San Jose, CA (US)

(72) Inventors: Chenhui Hu, Boston, MA (US); Devesh Solanki, Bengaluru (IN); Zhen Yu, San Jose, CA (US); Shudong Zhou, Fremont, CA (US); Rex Shang, San Jose, CA (US)

(73) Assignee: Zscaler, Inc., San Jose, CA (US)

( * ) Notice: Subject to any disclaimer, the term of this patent is extended or adjusted under 35 U.S.C. 154(b) by 76 days.

(21) Appl. No.: 18/584,147

(22) Filed: Feb. 22, 2024

(65) Prior Publication Data

US 2025/0272713 A1 Aug. 28, 2025

(51) Int. Cl.
*G06F 15/173* (2006.01)
*G06Q 30/0242* (2023.01)

(52) U.S. Cl.
CPC ................................. *G06Q 30/0246* (2013.01)

(58) Field of Classification Search
CPC ............. H04L 63/1416; H04L 63/1425; H04L 63/0236; H04L 43/08; H04W 24/06; H04W 24/08
See application file for complete search history.

(56) References Cited

U.S. PATENT DOCUMENTS

| | | | |
|---|---|---|---|
| 12,088,611 B1 * | 9/2024 | Lin | .......................... H04L 63/20 |
| 2019/0140910 A1 * | 5/2019 | Ganapathi | ............. H04L 41/145 |
| 2022/0070183 A1 * | 3/2022 | Goyal | ................. H04L 63/0236 |
| 2022/0086174 A1 * | 3/2022 | Helmsen | ............. H04L 47/2441 |
| 2023/0254318 A1 | 8/2023 | Hu et al. | |

* cited by examiner

*Primary Examiner* — Yves Dalencourt
(74) *Attorney, Agent, or Firm* — Baratta Law PLLC; Lawrence A. Baratta, Jr.; Ryan Odessa

(57) ABSTRACT

Systems and methods for generating and utilizing synthetic data include receiving a set of real network traffic data; generating synthetic data from the received set of real network traffic data based on patterns learned from the set of real network traffic data; and utilizing the synthetic data for any of training a machine learning model, testing a machine learning model, and configuring a customer cloud environment. The systems are adapted to generate a large amount of synthetic data from a limited set of real network traffic data. The produced synthetic data is altered in one or more ways to anonymize sensitive information present in the real data. Therefore, the systems are adapted to generate a large amount of synthetic data which accurately resembles real network traffic data while complying with data privacy practices.

20 Claims, 6 Drawing Sheets

600

<u>600</u>

SYSTEMS AND METHODS FOR GENERATING AND UTILIZING SYNTHETIC DATA

FIELD OF THE DISCLOSURE

The present disclosure generally relates to network and cloud security. More particularly, the present disclosure relates to systems and methods for generating and utilizing synthetic data.

BACKGROUND OF THE DISCLOSURE

Various challenges can appear when there is a need to perform Artificial Intelligence (AI) and/or Machine Learning (ML) model training and testing. These challenges include a limited amount of real-world data available for testing and training. Further, compliance and privacy concerns may limit the amount of partners/customers who are willing to share such real-world data. Additionally, in many cases, the data collected from such customers can only be persisted for a predetermined amount of time, for example, the data may only be allowed to be stored for one year before it must be deleted. Because the number of customers who allow usage of their data provide only a small fraction of the data which may be necessary to produce an accurate and dependable model, and because the data can only be utilized for a short period of time, the present disclosure provides systems and methods for producing synthetic data. This synthetic data can accurately represent real customer data while complying with data privacy practices.

BRIEF SUMMARY OF THE DISCLOSURE

The present disclosure relates to systems and methods for generating and utilizing synthetic data. In various embodiments, the present disclosure includes a method having steps, a processing device configured to implement the steps, a cloud-based system configured to implement the steps, and as a non-transitory computer-readable medium storing instructions for programming one or more processors to execute the steps. The steps include receiving a set of real network traffic data; generating synthetic data from the received set of real network traffic data based on patterns learned from the set of real network traffic data; and utilizing the synthetic data for any of training a machine learning model, testing a machine learning model, and configuring a customer cloud environment.

The steps can further include wherein the set of real data includes network traffic data traversing a cloud system, wherein the steps comprise performing inline monitoring of one or more customers of the cloud system; and storing network traffic data of the one or more customers based on the inline monitoring. The network traffic data can include transactions between users and destinations, wherein temporal correlation is persisted between the users and destinations with the network traffic data. The utilizing can include utilizing the synthetic data to simulate a customer cloud environment, wherein the simulated customer cloud environment is utilized to test cybersecurity monitoring and protection policy. The steps can further include providing a User Interface (UI) adapted to allow users to upload one or more sets of real data for generating synthetic data therefrom. The generating can further include anonymizing sensitive characteristics of the real data, wherein the sensitive characteristics includes any of user names, destination names, and IP addresses of destinations. The set of data can be any of data from public repositories, log data collected during inline monitoring of cloud customers, data collected from one or more third party cloud providers, and data collected from computing devices. The set of real data can include data from public repositories, wherein the steps further include selecting data from the set of real data based on unique file identifiers; and generating synthetic data based on the selected data. The synthetic data can include more data points than the received set of data.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

Again, the present disclosure relates to systems and methods for generating and utilizing synthetic data. Synthetic data generated by the present systems and methods can be utilized for performing model testing and training, cloud environment simulation, and quality control. Utilizing the present systems and methods can greatly reduce the amount of time it takes to test a model while increasing the accuracy of the model. In various embodiments, the systems are adapted to generate a large amount of synthetic data from a limited set of real data. Further, the produced synthetic data can be altered in one or more ways in order to anonymize sensitive information present in the real data. Therefore, the systems are adapted to generate a large amount of synthetic data which accurately resembles real data while complying with data privacy practices.

§ 1.0 Cybersecurity Monitoring and Protection Examples

Figure 1A:
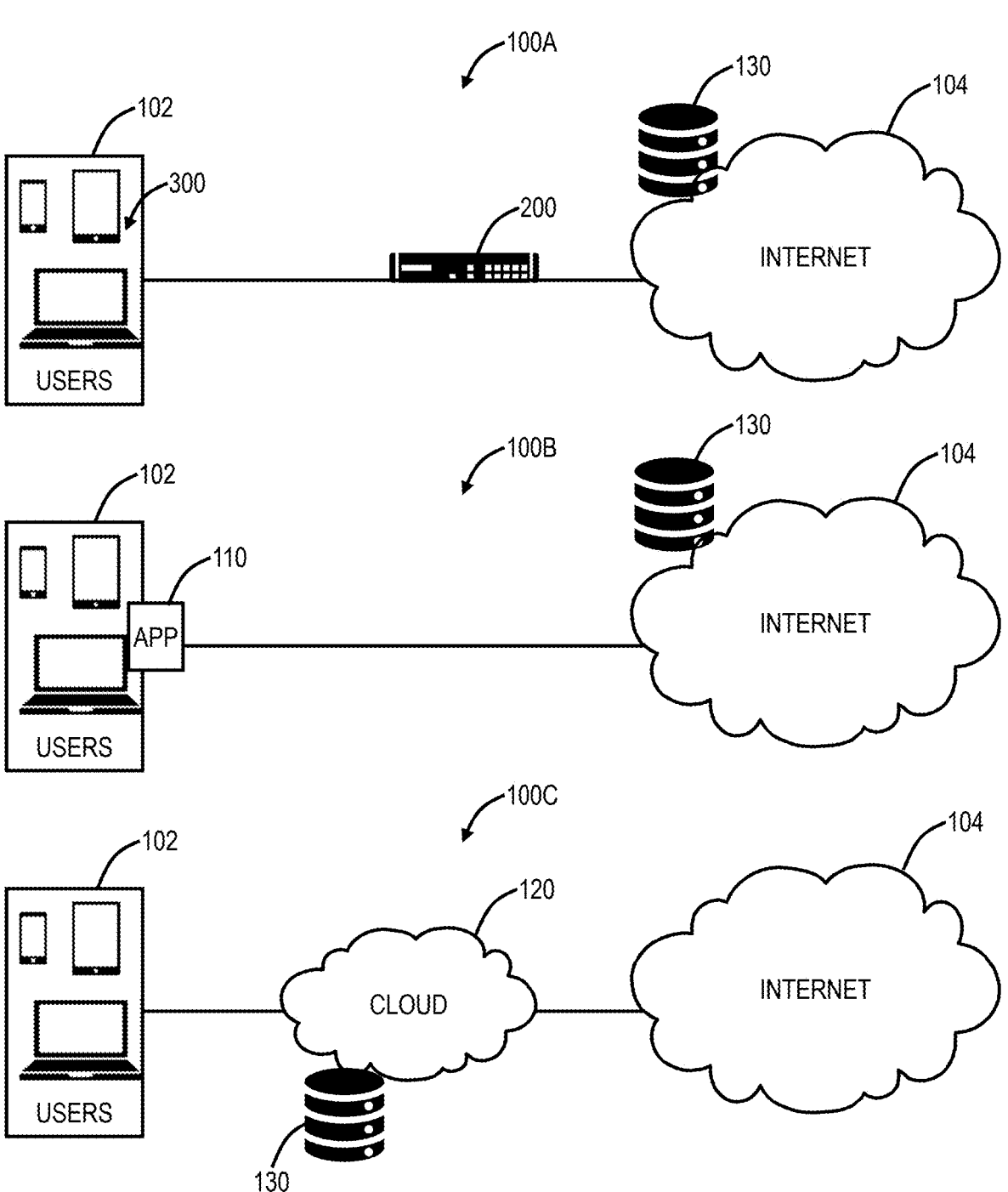
FIG. 1A is a network diagram of three example network configurations of cybersecurity monitoring and protection of a user.

FIG. 1A is a network diagram of three example network configurations 100A, 100B, 100C of cybersecurity monitoring and protection of an endpoint 102. Those skilled in the art will recognize these are some examples for illustration purposes, there may be other approaches to cybersecurity monitoring (as well as providing generalized services), and these various approaches can be used in combination with one another as well as individually. Also, while shown for a single endpoint 102, practical embodiments will handle a large volume of endpoints 102, including multi-tenancy. In this example, the endpoint 102 communicates on the Internet 104, including accessing cloud services, Software-as-a-

Figure 2:
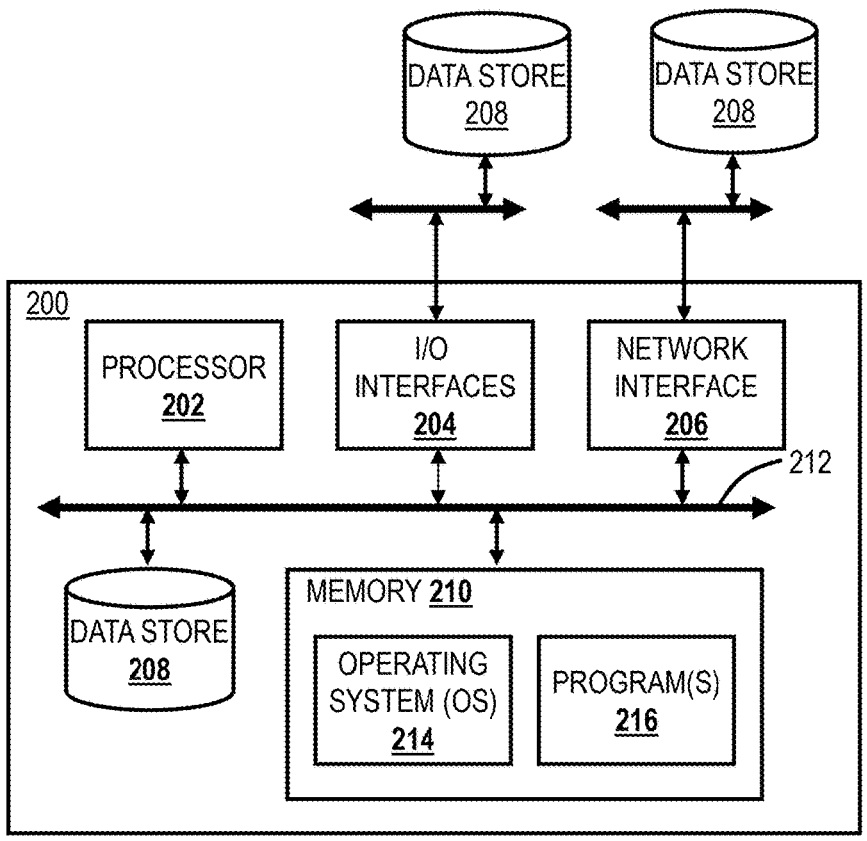
FIG. 2 is a block diagram of a server.

Service, etc. (each may be offered via computing resources, such as, e.g., using one or more servers 200 as illustrated in FIG. 2).

Note, the term endpoint 102 is used herein to refer to any computing device (see FIG. 3 for an example computing device 300) which can communicate on a network. The endpoint 102 can be associated with a user and include laptops, tablets, mobile phones, desktops, etc. Further, the endpoint can also mean machines, workloads, IoT devices, or simply anything associated with the company that connects to the Internet, a Local Area Network (LAN), etc.

As part of offering cybersecurity through these example network configurations 100A, 100B, 100C, there is a large amount of cybersecurity data obtained. Various embodiments of the present disclosure focus on using this cybersecurity data along with a customer's data to perform various security tasks including developing customer machine learning models and other security platforms of the like.

The network configuration 100A includes a server 200 located between the endpoint 102 and the Internet 104. For example, the server 200 can be a proxy, a gateway, a Secure Web Gateway (SWG), Secure Internet and Web Gateway, Secure Access Service Edge (SASE), Secure Service Edge (SSE), Cloud Application Security Broker (CASB), etc. The server 200 is illustrated located inline with the endpoint 102 and configured to monitor the endpoint 102. In other embodiments, the server 200 does not have to be inline. For example, the server 200 can monitor requests from the endpoint 102 and responses to the endpoint 102 for one or more security purposes, as well as allow, block, warn, and log such requests and responses. The server 200 can be on a local network associated with the endpoint 102 as well as external, such as on the Internet 104. Also, while described as a server 200, this can also be a router, switch, appliance, virtual machine, etc. The network configuration 100B includes an application 110 that is executed on the computing device 300. The application 110 can perform similar functionality as the server 200, as well as coordinated functionality with the server 200 (a combination of the network configurations 100A, 100B). Finally, the network configuration 100C includes a cloud service 120 configured to monitor the endpoint 102 and perform security-as-a-service. Of course, various embodiments are contemplated herein, including combinations of the network configurations 100A, 100B, 100C together.

The cybersecurity monitoring and protection can include firewall, intrusion detection and prevention, Uniform Resource Locator (URL) filtering, content filtering, bandwidth control, Domain Name System (DNS) filtering, protection against advanced threat (malware, spam, Cross-Site Scripting (XSS), phishing, etc.), data protection, sandboxing, antivirus, and any other security technique. Any of these functionalities can be implemented through any of the network configurations 100A, 100B, 100C. A firewall can provide Deep Packet Inspection (DPI) and access controls across various ports and protocols as well as being application and user aware. The URL filtering can block, allow, or limit website access based on policy for a user, group of users, or entire organization, including specific destinations or categories of URLs (e.g., gambling, social media, etc.). The bandwidth control can enforce bandwidth policies and prioritize critical applications such as relative to recreational traffic. DNS filtering can control and block DNS requests against known and malicious destinations.

The intrusion prevention and advanced threat protection can deliver full threat protection against malicious content such as browser exploits, scripts, identified botnets and malware callbacks, etc. The sandbox can block zero-day exploits (just identified) by analyzing unknown files for malicious behavior. The antivirus protection can include antivirus, antispyware, antimalware, etc. protection for the endpoints 102, using signatures sourced and constantly updated. The DNS security can identify and route command-and-control connections to threat detection engines for full content inspection. The DLP can use standard and/or custom dictionaries to continuously monitor the endpoints 102, including compressed and/or Transport Layer Security (TLS) or Secure Sockets Layer (SSL)-encrypted traffic.

In typical embodiments, the network configurations 100A, 100B, 100C can be multi-tenant and can service a large volume of the endpoints 102. Newly discovered threats can be promulgated for all tenants practically instantaneously. The endpoints 102 can be associated with a tenant, which may include an enterprise, a corporation, an organization, etc. That is, a tenant is a group of users who share a common grouping with specific privileges, i.e., a unified group under some IT management. The present disclosure can use the terms tenant, enterprise, organization, enterprise, corporation, company, etc. interchangeably and refer to some group of endpoints 102 under management by an IT group, department, administrator, etc., i.e., some group of endpoints 102 that are managed together. One advantage of multi-tenancy is the visibility of cybersecurity threats across a large number of endpoints 102, across many different organizations, across the globe, etc. This provides a large volume of data to analyze, use machine learning techniques on, develop comparisons, etc. The present disclosure can use the term "service provider" to denote an entity providing the cybersecurity monitoring and a "customer" as a company (or any other grouping of endpoints 102).

Of course, the cybersecurity techniques above are presented as examples. Those skilled in the art will recognize other techniques are also contemplated herewith. That is, any approach to cybersecurity that can be implemented via any of the network configurations 100A, 100B, 100C. Also, any of the network configurations 100A, 100B, 100C can be multi-tenant with each tenant having its own endpoints 102 and configuration, policy, rules, etc.

§ 1.1 Cloud Monitoring

The cloud 120 can scale cybersecurity monitoring and protection with near-zero latency on the endpoints 102. Also, the cloud 120 in the network configuration 100C can be used with or without the application 110 in the network configuration 100B and the server 200 in the network configuration 100A. Logically, the cloud 120 can be viewed as an overlay network between endpoints 102 and the Internet 104 (and cloud services, SaaS, etc.). Previously, the IT deployment model included enterprise resources and applications stored within a data center (i.e., physical devices) behind a firewall (perimeter), accessible by employees, partners, contractors, etc. on-site or remote via Virtual Private Networks (VPNs), etc. The cloud 120 replaces the conventional deployment model. The cloud 120 can be used to implement these services in the cloud without requiring the physical appliances and management thereof by enterprise IT administrators. As an ever-present overlay network, the cloud 120 can provide the same functions as the physical devices and/or appliances regardless of geography or location of the endpoints 102, as well as independent of platform, operating system, network access technique, network access provider, etc.

There are various techniques to forward traffic between the endpoints 102 and the cloud 120. A key aspect of the cloud 120 (as well as the other network configurations 100A, 100B) is that all traffic between the endpoints 102 and the Internet 104 is monitored. All of the various monitoring approaches can include log data 130 accessible by a management system, management service, analytics platform, and the like. For illustration purposes, the log data 130 is shown as a data storage element and those skilled in the art will recognize the various compute platforms described herein can have access to the log data 130 for implementing any of the techniques described herein for risk quantification. In an embodiment, the cloud 120 can be used with the log data 130 from any of the network configurations 100A, 100B, 100C, as well as other data from external sources.

The cloud 120 can be a private cloud, a public cloud, a combination of a private cloud and a public cloud (hybrid cloud), or the like. Cloud computing systems and methods abstract away physical servers, storage, networking, etc., and instead offer these as on-demand and elastic resources. The National Institute of Standards and Technology (NIST) provides a concise and specific definition which states cloud computing is a model for enabling convenient, on-demand network access to a shared pool of configurable computing resources (e.g., networks, servers, storage, applications, and services) that can be rapidly provisioned and released with minimal management effort or service provider interaction. Cloud computing differs from the classic client-server model by providing applications from a server that are executed and managed by a client's web browser or the like, with no installed client version of an application required. Centralization gives cloud service providers complete control over the versions of the browser-based and other applications provided to clients, which removes the need for version upgrades or license management on individual client computing devices. The phrase "Software-as-a-Service" (SaaS) is sometimes used to describe application programs offered through cloud computing. A common shorthand for a provided cloud computing service (or even an aggregation of all existing cloud services) is "the cloud." The cloud 120 contemplates implementation via any approach known in the art.

The cloud 120 can be utilized to provide example cloud services, including Zscaler Internet Access (ZIA), Zscaler Private Access (ZPA), Zscaler Workload Segmentation (ZWS), and/or Zscaler Digital Experience (ZDX), all from Zscaler, Inc. (the assignee and applicant of the present application). Also, there can be multiple different clouds 120, including ones with different architectures and multiple cloud services. The ZIA service can provide access control, threat prevention, and data protection. ZPA can include access control, microservice segmentation, etc. The ZDX service can provide monitoring of user experience, e.g., Quality of Experience (QoE), Quality of Service (QOS), etc., in a manner that can gain insights based on continuous, inline monitoring. For example, the ZIA service can provide a user with Internet Access, and the ZPA service can provide a user with access to enterprise resources instead of traditional Virtual Private Networks (VPNs), namely ZPA provides Zero Trust Network Access (ZTNA). Those of ordinary skill in the art will recognize various other types of cloud services are also contemplated.

§ 1.2 Zero Trust

Figure 1B:
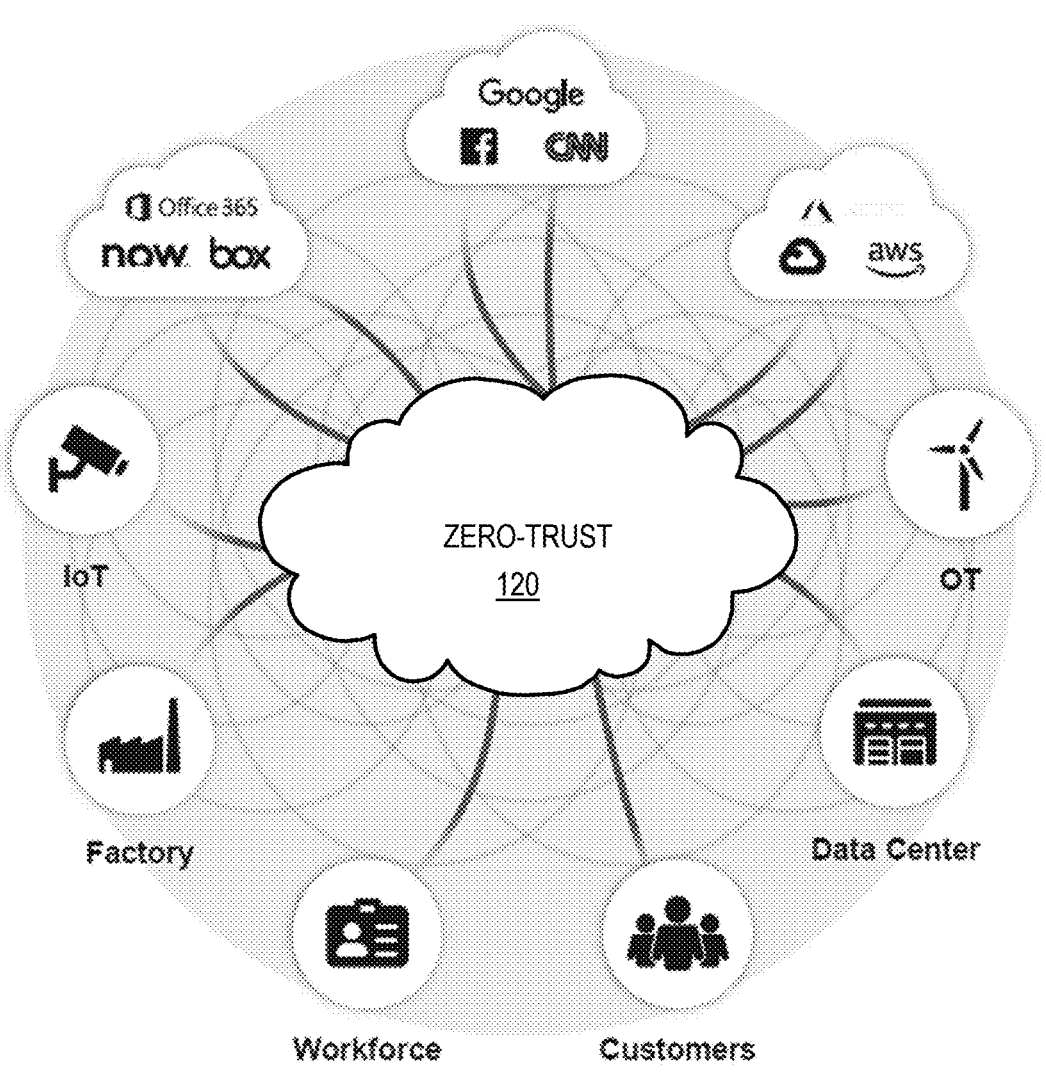
FIG. 1B is a logical diagram of the cloud operating as a zero-trust platform.

FIG. 1B is a logical diagram of the cloud 120 operating as a zero-trust platform. Zero trust is a framework for securing organizations in the cloud and mobile world that asserts that no user or application should be trusted by default. Following a key zero trust principle, least-privileged access, trust is established based on context (e.g., user identity and location, the security posture of the endpoint, the app or service being requested) with policy checks at each step, via the cloud 120. Zero trust is a cybersecurity strategy where security policy is applied based on context established through least-privileged access controls and strict user authentication—not assumed trust. A well-tuned zero trust architecture leads to simpler network infrastructure, a better user experience, and improved cyberthreat defense.

Establishing a zero-trust architecture requires visibility and control over the environment's users and traffic, including that which is encrypted; monitoring and verification of traffic between parts of the environment; and strong multifactor authentication (MFA) approaches beyond passwords, such as biometrics or one-time codes. This is performed via the cloud 120. Critically, in a zero-trust architecture, a resource's network location is not the biggest factor in its security posture anymore. Instead of rigid network segmentation, your data, workflows, services, and such are protected by software-defined micro segmentation, enabling you to keep them secure anywhere, whether in your data center or in distributed hybrid and multi-cloud environments.

The core concept of zero trust is simple: assume everything is hostile by default. It is a major departure from the network security model built on the centralized data center and secure network perimeter. These network architectures rely on approved IP addresses, ports, and protocols to establish access controls and validate what's trusted inside the network, generally including anybody connecting via remote access VPN. In contrast, a zero-trust approach treats all traffic, even if it is already inside the perimeter, as hostile. For example, workloads are blocked from communicating until they are validated by a set of attributes, such as a fingerprint or identity. Identity-based validation policies result in stronger security that travels with the workload wherever it communicates—in a public cloud, a hybrid environment, a container, or an on-premises network architecture.

Because protection is environment-agnostic, zero trust secures applications and services even if they communicate across network environments, requiring no architectural changes or policy updates. Zero trust securely connects users, devices, and applications using business policies over any network, enabling safe digital transformation. Zero trust is about more than user identity, segmentation, and secure access. It is a strategy upon which to build a cybersecurity ecosystem.

At its core are three tenets:

Terminate every connection: Technologies like firewalls use a "passthrough" approach, inspecting files as they are delivered. If a malicious file is detected, alerts are often too late. An effective zero trust solution terminates every connection to allow an inline proxy architecture to inspect all traffic, including encrypted traffic, in real time—before it reaches its destination—to prevent ransomware, malware, and more.

Protect data using granular context-based policies: Zero trust policies verify access requests and rights based on context, including user identity, device, location, type of content, and the application being requested. Policies are adaptive, so user access privileges are continually reassessed as context changes.

Reduce risk by eliminating the attack surface: With a zero-trust approach, users connect directly to the apps and resources they need, never to networks (see ZTNA). Direct user-to-app and app-to-app connections eliminate the risk of lateral movement and prevent compromised devices from infecting other resources. Plus, users and apps are invisible to the internet, so they cannot be discovered or attacked.

§ 1.3 Log Data

With the cloud 120 as well as any of the network configurations 100A, 100B, 100C, the log data 130 can include a rich set of statistics, logs, history, audit trails, and the like related to various endpoint 102 transactions. Generally, this rich set of data can represent activity by an endpoint 102. This information can be for multiple endpoints 102 of a company, organization, etc., and analyzing this data can provide a wealth of information as well as training data for machine learning models.

The log data 130 can include a large quantity of records used in a backend data store for queries. A record can be a collection of tens of thousands of counters. A counter can be a tuple of an identifier (ID) and value. As described herein, a counter represents some monitored data associated with cybersecurity monitoring. Of note, the log data can be referred to as sparsely populated, namely a large number of counters that are sparsely populated (e.g., tens of thousands of counters or more, and possible orders of magnitude or more of which are empty). For example, a record can be stored every time period (e.g., an hour or any other time interval). There can be millions of active endpoints 102 or more. Examples of the sparsely populated log data can be the Nanolog system from Zscaler, Inc., the applicant.

Also, such data is described in the following:

Commonly-assigned U.S. Pat. No. 8,429,111, issued Apr. 23, 2013, and entitled "Encoding and compression of statistical data," the contents of which are incorporated herein by reference, describes compression techniques for storing such logs, Commonly-assigned U.S. Pat. No. 9,760,283, issued Sep. 12, 2017, and entitled "Systems and methods for a memory model for sparsely updated statistics," the contents of which are incorporated herein by reference, describes techniques to manage sparsely updated statistics utilizing different sets of memory, hashing, memory buckets, and incremental storage, and Commonly-assigned U.S. patent application Ser. No. 16/851,161, filed Apr. 17, 2020, and entitled "Systems and methods for efficiently maintaining records in a cloud-based system," the contents of which are incorporated herein by reference, describes compression of sparsely populated log data.

A key aspect here is that the cybersecurity monitoring is rich and provides a wealth of information to determine various assessments of cybersecurity. In some embodiments, the log data 130 can be referred to as weblogs or the like. Of note, with various cybersecurity monitoring techniques via the network configurations 100A, 100B, 100C, as well as with other network configurations, the log data 130 is a rich repository of endpoint 102 activity. Unlike websites, specific cloud services, application providers, etc., cybersecurity monitoring can log almost all of an endpoint's 102 activity. That is, the log data 130 is not merely confined to specific activity (e.g., an endpoint's 102 social networking activity on a specific site, an endpoint's 102 search requests on a specific search engine, etc.).

§ 2.0 Example Server Architecture

FIG. 2 is a block diagram of a server 200, which may be used as a destination on the Internet, for the network configuration 100A, etc. The server 200 may be a digital computer that, in terms of hardware architecture, generally includes a processor 202, input/output (I/O) interfaces 204, a network interface 206, a data store 208, and memory 210. It should be appreciated by those of ordinary skill in the art that FIG. 2 depicts the server 200 in an oversimplified manner, and a practical embodiment may include additional components and suitably configured processing logic to support known or conventional operating features that are not described in detail herein. The components (202, 204, 206, 208, and 210) are communicatively coupled via a local interface 212. The local interface 212 may be, for example, but not limited to, one or more buses or other wired or wireless connections, as is known in the art. The local interface 212 may have additional elements, which are omitted for simplicity, such as controllers, buffers (caches), drivers, repeaters, and receivers, among many others, to enable communications. Further, the local interface 212 may include address, control, and/or data connections to enable appropriate communications among the aforementioned components.

The processor 202 is a hardware device for executing software instructions. The processor 202 may be any custom made or commercially available processor, a Central Processing Unit (CPU), an auxiliary processor among several processors associated with the server 200, a semiconductor-based microprocessor (in the form of a microchip or chipset), or generally any device for executing software instructions. When the server 200 is in operation, the processor 202 is configured to execute software stored within the memory 210, to communicate data to and from the memory 210, and to generally control operations of the server 200 pursuant to the software instructions. The I/O interfaces 204 may be used to receive user input from and/or for providing system output to one or more devices or components.

The network interface 206 may be used to enable the server 200 to communicate on a network, such as the Internet 104. The network interface 206 may include, for example, an Ethernet card or adapter or a Wireless Local Area Network (WLAN) card or adapter. The network interface 206 may include address, control, and/or data connections to enable appropriate communications on the network. A data store 208 may be used to store data. The data store 208 may include any volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 208 may incorporate electronic, magnetic, optical, and/or other types of storage media. In one example, the data store 208 may be located internal to the server 200, such as, for example, an internal hard drive connected to the local interface 212 in the server 200. Additionally, in another embodiment, the data store 208 may be located external to the server 200 such as, for example, an external hard drive connected to the I/O interfaces 204 (e.g., SCSI or USB connection). In a further embodiment, the data store 208 may be connected to the server 200 through a network, such as, for example, a network-attached file server.

The memory 210 may include any volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 210 may incorporate electronic, magnetic, optical, and/or other types of storage media. Note that the memory 210 may have a distributed architecture, where various components are situated remotely from one another but can be accessed by the processor 202. The software in memory 210 may include one or more software programs, each of which includes an ordered listing of executable instructions for implementing logical functions. The software in the memory 210 includes a suitable Operating System (O/S) 214 and one or more programs 216. The operating system 214 essentially controls the execution of other computer programs, such as the one or more programs 216, and provides scheduling, input-output control, file and data management, memory management, and communication control and related services. The one or more programs 216 may be configured to implement the various processes, algorithms, methods, techniques, etc. described herein. Those skilled in the art will recognize the cloud 120 ultimately runs on one or more physical servers 200, virtual machines, etc..

§ 3.0 Example Computing Device Architecture

Figure 3:
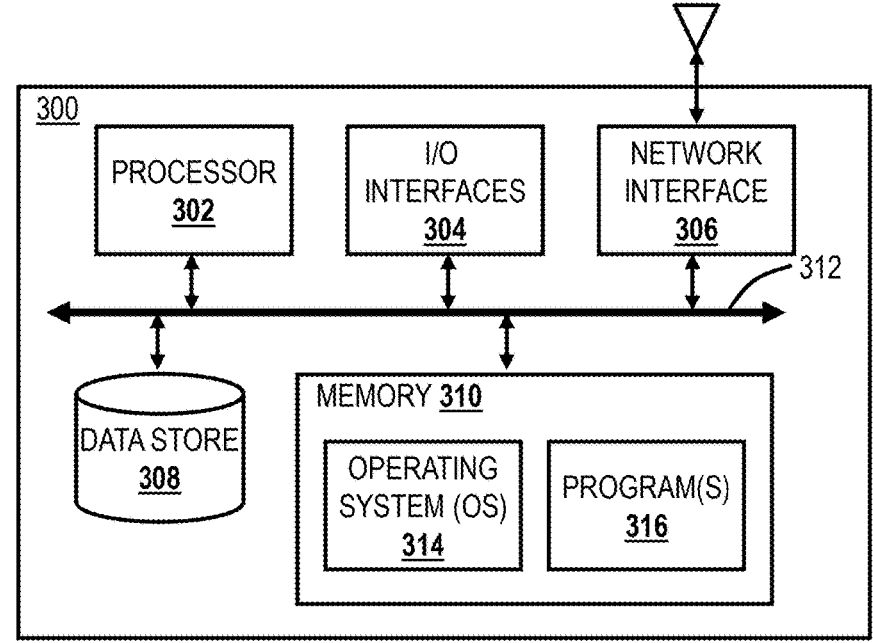
FIG. 3 is a block diagram of a computing device.

FIG. 3 is a block diagram of a computing device 300, which may be realized as an endpoint 102. Specifically, the computing device 300 can form a device used by one of the endpoints 102, and this may include common devices such as laptops, smartphones, tablets, netbooks, personal digital assistants, cell phones, e-book readers, Internet-of-Things (IoT) devices, servers, desktops, printers, televisions, streaming media devices, storage devices, and the like, i.e., anything that can communicate on a network. The computing device 300 can be a digital device that, in terms of hardware architecture, generally includes a processor 302, I/O interfaces 304, a network interface 306, a data store 308, and memory 310. It should be appreciated by those of ordinary skill in the art that FIG. 3 depicts the computing device 300 in an oversimplified manner, and a practical embodiment may include additional components and suitably configured processing logic to support known or conventional operating features that are not described in detail herein. The components (302, 304, 306, 308, and 302) are communicatively coupled via a local interface 312. The local interface 312 can be, for example, but not limited to, one or more buses or other wired or wireless connections, as is known in the art. The local interface 312 can have additional elements, which are omitted for simplicity, such as controllers, buffers (caches), drivers, repeaters, and receivers, among many others, to enable communications. Further, the local interface 312 may include address, control, and/or data connections to enable appropriate communications among the aforementioned components.

The processor 302 is a hardware device for executing software instructions. The processor 302 can be any custom made or commercially available processor, a CPU, an auxiliary processor among several processors associated with the computing device 300, a semiconductor-based microprocessor (in the form of a microchip or chipset), or generally any device for executing software instructions. When the computing device 300 is in operation, the processor 302 is configured to execute software stored within the memory 310, to communicate data to and from the memory 310, and to generally control operations of the computing device 300 pursuant to the software instructions. In an embodiment, the processor 302 may include a mobile-optimized processor such as optimized for power consumption and mobile applications. The I/O interfaces 304 can be used to receive user input from and/or for providing system output. User input can be provided via, for example, a keypad, a touch screen, a scroll ball, a scroll bar, buttons, a barcode scanner, and the like. System output can be provided via a display device such as a Liquid Crystal Display (LCD), touch screen, and the like.

The network interface 306 enables wireless communication to an external access device or network. Any number of suitable wireless data communication protocols, techniques, or methodologies can be supported by the network interface 306, including any protocols for wireless communication. The data store 308 may be used to store data. The data store 308 may include any volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 308 may incorporate electronic, magnetic, optical, and/or other types of storage media.

The memory 310 may include any volatile memory elements (e.g., random access memory (RAM, such as DRAM, SRAM, SDRAM, etc.)), nonvolatile memory elements (e.g., ROM, hard drive, etc.), and combinations thereof. Moreover, the memory 310 may incorporate electronic, magnetic, optical, and/or other types of storage media. Note that the memory 310 may have a distributed architecture, where various components are situated remotely from one another, but can be accessed by the processor 302. The software in memory 310 can include one or more software programs, each of which includes an ordered listing of executable instructions for implementing logical functions. In the example of FIG. 3, the software in the memory 310 includes a suitable operating system 314 and programs 316. The operating system 314 essentially controls the execution of other computer programs and provides scheduling, input-output control, file and data management, memory management, and communication control and related services. The programs 316 may include various applications, add-ons, etc. configured to provide end-user functionality with the computing device 300. For example, example programs 316 may include, but not limited to, a web browser, social networking applications, streaming media applications, games, mapping and location applications, electronic mail applications, financial applications, and the like. The application 110 can be one of the example programs.

§ 4.0 Application for Traffic Forwarding and Monitoring

Again, the network configuration 100B includes an application 110 that is executed on the computing device 300. The application 110 can perform similar functionality as the server 200, as well as coordinated functionality with the server 200 (a combination of the network configurations 100A, 100B). Of course, various embodiments are contemplated herein, including combinations of the network configurations 100A, 100B, 100C together. For example, the application 110 can perform similar functionality as the cloud 120, as well as coordinated functionality with the cloud 120.

Figure 4:
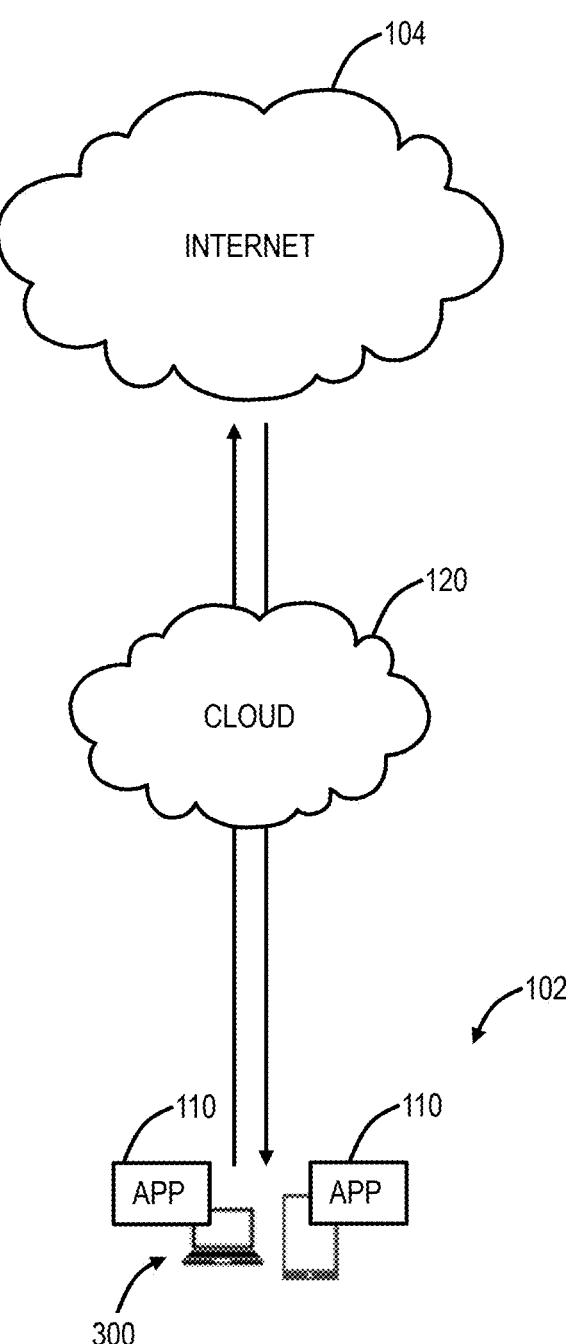
FIG. 4 is a diagram of an exemplary network configuration illustrating an application on computing devices configured to operate through the cloud.

FIG. 4 is a network diagram of an exemplary network configuration illustrating an application 110 on computing devices 300 configured to operate through the cloud 120. Different types of computing devices 300 are proliferating, including Bring Your Own Device (BYOD) as well as IT-managed devices. The conventional approach for a computing device 300 to operate with the cloud 120 as well as for accessing enterprise resources includes complex policies, VPNs, poor user experience, etc. The application 110 can automatically forward user traffic with the cloud 120 as well as ensuring that security and access policies are enforced, regardless of device, location, operating system, or application. The application 110 automatically determines if a user associated with an endpoint 102 is looking to access the open Internet 104, a SaaS app, or an internal app running in public, private, or the datacenter and routes mobile traffic through the cloud 120. The application 110 can support various cloud services, including ZIA, ZPA, ZDX, etc., allowing the best in class security with zero trust access to internal applications. As described herein, the application 110 can also be referred to as a connector application.

The application 110 is configured to auto-route traffic for seamless user experience. This can be protocol as well as application-specific, and the application 110 can route traffic with a nearest or best fit node of the cloud 120. Further, the application 110 can detect trusted networks, allowed applications, etc. and support secure network access. The application 110 can also support the enrollment of the computing device 300 prior to accessing applications, the internet, or any services provided by the cloud 120. The application 110 can uniquely detect the users based on fingerprinting the user device 300, using criteria like device model, platform, operating system, device posture, etc. The application 110 can support Mobile Device Management (MDM) functions, allowing IT personnel to deploy and manage the computing devices 300 seamlessly. This can also include the automatic installation of client and SSL certificates during enrollment. Finally, the application 110 provides visibility into device and app usage of the user of the computing device 300.

The application 110 supports a secure, lightweight tunnel between the computing device 300 and the cloud 120. For example, the lightweight tunnel can be HTTP-based. With the application 110, there is no requirement for PAC files, an IPSec VPN, authentication cookies, or user setup.

§ 5.0 Machine Learning in Network Security

Machine learning can be used in various applications, including malware detection, intrusion detection, threat classification, the user or content risk, detecting malicious clients or bots, detecting non-characteristic user transactions, etc. In a particular use case, machine learning can be used on a content item and/or user transaction to determine if further processing is required during inline processing in the cloud 120. For example, machine learning can be used in conjunction with a sandbox to identify malicious files transferred in traffic. A sandbox, as the name implies, is a safe environment where a file can be executed, opened, etc. for test purposes to determine whether a file is malicious or benign.

Machine learning can determine a verdict in advance before a file is sent to the sandbox. If a file is predicted as benign, it does not need to be sent to the sandbox. Otherwise, it is sent to the sandbox for further analysis/processing. Advantageously, utilizing machine learning to pre-filter a file significantly improves user experience by reducing the overall quarantine time as well as reducing workload in the sandbox. Of course, machine learning cannot replace the sandbox since malicious information from a static file is limited, while the sandbox can get a more accurate picture with dynamic behavior analysis. Further, it follows that machine learning predictions require high precision due to the impact of a false prediction, i.e., finding a malicious file to be benign.

In the context of inline processing, sandboxing does a great job in detecting malicious files, but there is a cost in latency, which affects user experience. Machine learning can alleviate this issue by giving an earlier verdict on the static files. However, it requires ML to have extremely high precision, since the cost of a false positive and false negative are very high. For example, a benign hospital life-threatening file, if mistakenly blocked due to an ML model's wrong verdict, would cause a life disaster. Similarly, undetected ransomware could cause problems for an enterprise. Therefore, there is a need for a high-precision approach for both benign and malicious files.

Similarly, machine learning can determine a verdict in advance before a transaction reaches a destination. By training machine learning models with historic network traffic transactions, models can be trained to identify non-characteristic transactions performed by users of the cloud 120.

The conventional approach to improve precision includes improving the probability threshold to increase precision. A p-value (probability value) is a statistical assessment for measuring the reliability of a prediction, but this does not identify the unreliability of predictions with high probabilities.

As described here, the typical machine learning training process collects millions of samples, extracts a set of features from these samples, and feeds the features into a machine learning model to determine patterns in the data. The output of this training process is a machine learning model that can predict various characteristics of the data, such as whether a file that has not been seen before is malicious or not, whether a transaction monitored via the cloud 120 is malicious or not, and the like.

It was determined that it is possible to match the production data with samples in the public repositories based on the unique identifiers. In this manner, the production data can be used while still maintaining strict data privacy. That is, the training data (or data used for generating synthetic data) is fully from the public repositories with the selection of the data in the public repositories based on the unique identifiers in the production data. Stated differently, the log data in storage includes the unique identifiers from the production data, but not the actual samples. It is possible to get the actual samples in the public repositories, thereby maintaining customer privacy.

Adding the remainder of these production samples into the training dataset produces a more sophisticated model. However, due to a much smaller scale of variety and amount of these production samples, there was still room for improvement.

§ 6.0 Leveraging Public Data for Training Data

The key to further improving model performance includes leveraging the larger set of public data in the public repositories more effectively. As such, the present disclosure includes a technique for learning the similarity between production data samples and public data samples, to emphasize the training instances from the public data that are most similar to production data.

More specifically, the present disclosure leverages dimension reduction techniques such as parametric t-distributed Stochastic Neighbor Embedding (tSNE) and an autoencoder to learn representations of the production data and calculated Euclidean distances of each non-production sample from production samples in the reduced dimensions.

It was discovered that a large portion of the training set was poorly representative of the production data, which conforms with the hypothesis that the suboptimal model performance is attributable to the difference between the two datasets. Fortunately, it was discovered that a significant number of the training samples that do not appear in the production data are similar enough to the production samples to be useful in training, generating additional synthetic data, and the like.

§ 7.0 Generating and Utilizing Synthetic Data

The present disclosure provides systems and methods for solving challenges associated with developing and testing models. Various challenges can arise when there is a need to perform model training and testing. These challenges include a limited amount of real-world data available for testing and training. Further, compliance and privacy concerns may limit the amount of partners/customers who are willing to share such real-world data. For example, the cloud 120 is adapted to serve a large number of customers. Out of these customers, there is a very limited amount of data that can be used for model production and testing. The customers which provide data for model production and testing can include design partners which consent to data usage, and the like. Further, in many cases, the data collected from such customers can only be persisted for a predetermined amount of time, for example, the data may only be allowed to be stored for one year before it must be deleted. Because the number of customers who allow usage of their data is only a small fraction of the customers which the cloud 120 can serve, and because the data can only be utilized for a short period of time, the present disclosure provides systems and methods for producing synthetic data. This synthetic data can accurately represent real customer data while complying with data privacy practices.

In various embodiments, the synthetic data generated by the present systems and methods are utilized for performing model testing and training, cloud environment simulation, and quality control. Utilizing the present systems and methods can greatly reduce the amount of time it takes to test a model while increasing the accuracy of the model. For example, it can take one month to develop a model, but can then take two to three months to perform testing and quality assurance. With the ability to simulate data, a great amount of accurate production data can be simulated to represent real production data in customer environments. This synthetic data can then be utilized to test and perform quality assurance for models.

The real data utilized for generating synthetic data can be data collected or received from public repositories, log data collected during inline monitoring of cloud customers, data collected from one or more third party cloud providers, data collected from computing devices, i.e., data provided by the application 110 to the cloud 120, and the like.

In an embodiment, the systems and methods can utilize real customer traffic for simulating transactions that accurately resemble the real traffic. Again, the real traffic/data can be real customer data collected via inline monitoring. The real traffic can include various transactions performed by users during monitoring, i.e., data collected from users using applications, visiting various destinations, etc. To comply with privacy practices, the systems are adapted to learn patterns from the real data such as, from a transaction, the systems can simulate a domain name and user name, but keep the pattern of the transaction. That is, the distribution of the simulated traffic can be similar to the distribution of the real traffic, but sensitive characteristics of the data such as domain/application names, IP addresses, and user names can be anonymized.

Patterns learned by the present systems used to simulate traffic can include how many applications each user accesses within a time period on average, i.e., within a week, month, etc., the number of users a specific application has, the distribution of the users among different departments, and the probability of a user to access a specific application after accessing another specific application, i.e., the probability of switching from one application to another application. Monitoring and identifying the distribution of the users among different departments which access a specific application can include determining how many users from various organization departments, i.e., accounting, engineering, sales, etc. access specific applications. For example, engineering employees will access engineering applications while sales employees will mostly access sales related applications. Such patterns can further uncover relationships between port numbers and protocols used to access applications, which can be used in simulating traffic.

The learning of patterns in the real data can include, for example, learning transaction patterns. These transaction patterns can include information such as which users have access to which applications. Further, the patterns can include temporal information such as time series patterns. For example, a user1 may access an app1 and then access an app2. This temporal correlation can be utilized by the simulator to more accurately simulate real data. Again, all of the data is anonymized such as user names, application/destination names, destination IP addresses, etc. That is, only the distribution, meaning the transaction patterns are kept. Even so, the transaction patterns are not completely kept because it is not desired to completely duplicate the data of a customer. More specifically, it is beneficial to contribute perturbations in the simulations to more diversely simulate data of various customers. Thereby, the synthetic data will look similar to the real data, but not completely identical so that the synthetic data can be used to further test edge cases of models.

Additionally, in various embodiments, for the example of simulating customer transactions, the characteristics of users, destinations, etc. can be extracted in order to simulate such users, destinations, and the like. That is, users of a customer can be grouped into various departments, security groups, etc. while destinations such as applications can have various characteristics such as application type, security level, etc. These characteristics can then be used to simulate transactions without the need of persisting personal data such as user names and destination names.

In other embodiments, the present data simulation processes can be utilized on any generalized data that can be presented as tabular data. That is, the simulator can be fed any sample data having a format, where it can learn the distribution and then generalize and simulate more data. More specifically, the present systems and methods can be utilized to generate synthetic data from any set of data, and not just network traffic data as described herein. The various examples of generating synthetic network traffic data shall be construed as a non-limiting example.

The real data used in the simulator can include log data 130 stored in the cloud 120, data stored locally on computing devices 300, and the like. Further, the real data can be collected from any third party cloud provider such as Azure, Google, Amazon Web Services (AWS). Etc. For log data 130 stored in the cloud 120, the various embodiments can include performing inline monitoring of customer traffic, and storing network traffic data of customers who allow such data storage as described herein.

In an example use case, the present systems and methods can be used for quality assurance of software. If the software is going to be provided to thousands of customers, but only a few customers, for example ten customers, agree to provide real log data, it can be difficult to ensure that production will go well. Therefore, given the ten customers data, the systems can generate synthetic data, correct errors, and continue to generate more and more synthetic/simulated data with greater accuracy. That is, the present systems can utilize a generator and discriminator process, i.e., a reinforcement learning approach, for generating more accurate synthetic data. Thus, from the relatively small amount of data, the systems can generate any amount of accurate synthetic data desired for performing quality assurance. That is, the systems can generate more data than the provided real data. In embodiments, any amount of synthetic data can be generated from the real data based on the desired utilization of the synthetic data. For example, when training a machine learning model, it is beneficial to have as much data as possible, thus, the systems can be configured to generate a large amount of synthetic data in such cases.

The present systems and methods provide realistic data pattern simulation, large volumes of data generation, and anonymization of sensitive information. Further, in various embodiments, by utilizing the present systems and methods, custom model training can be supported. In another example use case, the present systems and method can be utilized for pre-training models for customers of the cloud 120. That is, the systems can create and utilize simulated data to pre-train one or more models for a customer environment. These models can include various security models such as the malware detection model described herein. Additionally, a customer's access policy can be pre-trained/pre-configured based on simulated data. This is possible due to the present simulation systems ability to simulate user transactions based on patterns and temporal information.

Again, in various embodiments, the present data simulation systems can be utilized for testing cybersecurity monitoring and protection policy in customer cloud environments. That is, when onboarding a new customer, it can optimize their onboarding experience by being able to test various cybersecurity monitoring and protection policies on synthetic data rather than on live production traffic. Such uses can include generating and selecting cybersecurity monitoring and protection policies, and testing the various policies with synthetic data. Thus, customer data is not at risk due to poorly configured environment policies and/or during testing.

Further, various embodiments contemplate the usage of techniques for learning the similarity between production data samples and public data samples, to emphasize the training instances from the public data that are most similar to production data. That is, prior to the generation of synthetic data, the steps can include performing the described methods for selecting data that most closely resembles production data. For example, the real data received from public repositories can be filtered and selected via the processes described herein to most closely resemble production data which can then be used to generate synthetic data.

Figure 5:
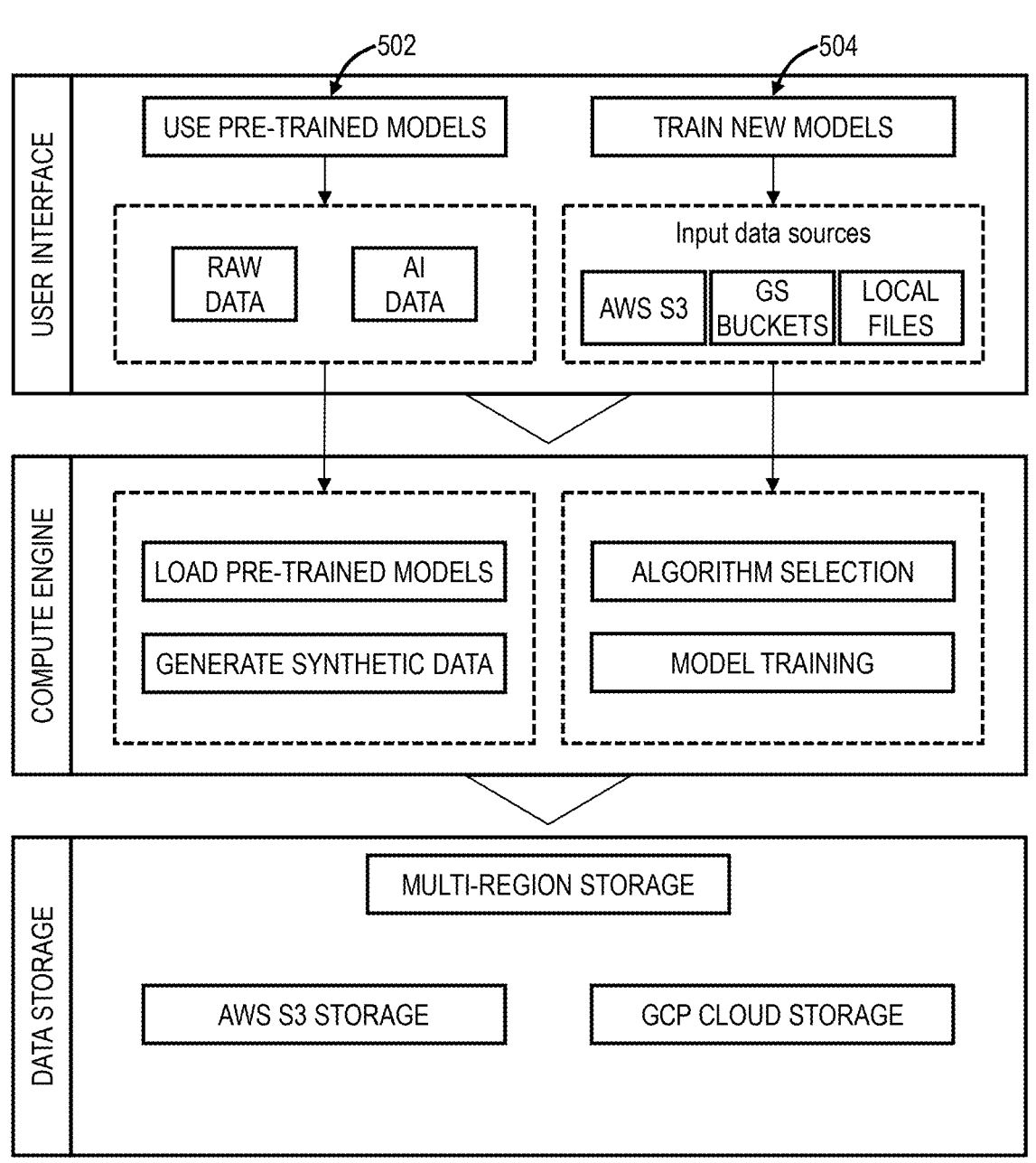
FIG. 5 is a flow diagram of the present systems and methods for data simulation.

The present systems for data simulation can be provided via an application/User Interface (UI). Administrators can upload real data though the UI for the systems to utilize for generating simulated data. FIG. 5 is a flow diagram of the present systems and methods for data simulation. Again, in embodiments, any amount of synthetic data can be generated from the real data based on the desired utilization of the synthetic data. The UI can include an option to specify how much synthetic data is to be generated.

FIG. 5. Shows a process for using pre-trained models for data simulation 502 and a process for training new models for data simulation 504. Pre-trained models are contemplated as models which have already been trained on limited data available using any of reinforcement learning, statistical based approaches, etc. For example, algorithms used for training such models can include Conditional Tabular Generative Adversarial Network (CTGAN), Gaussian Copula, Hierarchical ML Algorithm (HMA) synthesizer, Parametric Auto-Regressive (PAR) synthesizer, etc. When utilizing pre-trained models, the process includes utilizing one or more models which have been trained using data available for training. The data can be inferenced directly from these models, and users do not need to provide any data and does not need any prior knowledge. In contrast, when training new models, a user must provide some data for training and have prior knowledge of algorithms. Users can select an algorithm of choice via the UI, upload their data, and the systems will generate synthetic data based on the uploaded data. Similarly, via the UI, users can select to use pre-trained models via the UI.

§ 7.1 Process for Generating and Utilizing Synthetic Data

Figure 6:
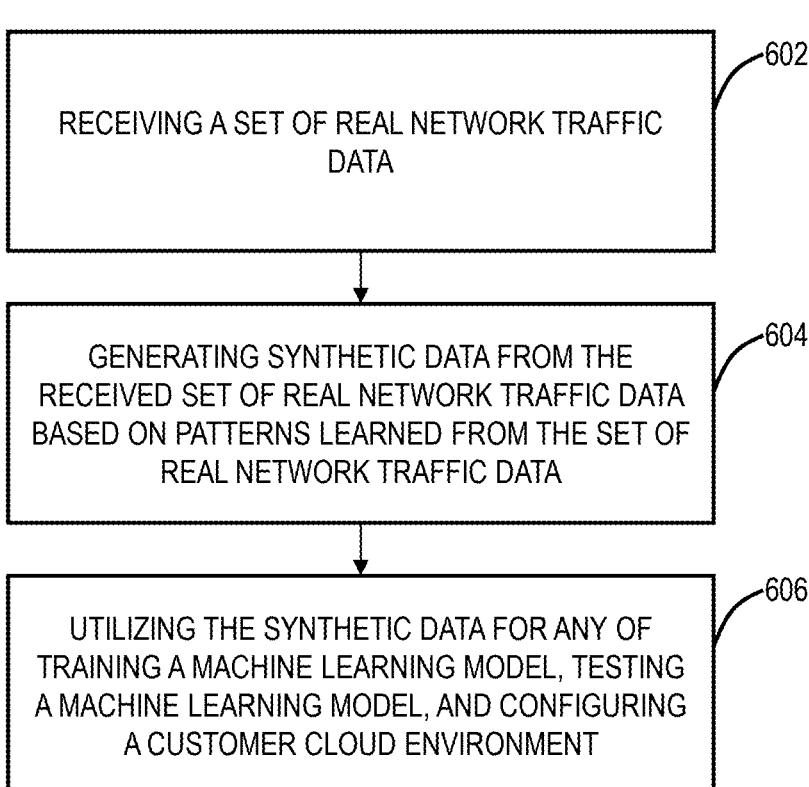
FIG. 6 is a flow chart of a process for generating and utilizing synthetic data.

FIG. 6 is a flow chart of a process 600 for generating and utilizing synthetic data. The process 600 includes receiving a set of real network traffic data (step 602); generating synthetic data from the received set of real network traffic data based on patterns learned from the set of real network traffic data (step 604); and utilizing the synthetic data for any of training a machine learning model, testing a machine learning model, and configuring a customer cloud environment (step 606).

The process 600 can further include wherein the set of real data includes network traffic data traversing a cloud system, wherein the steps comprise performing inline monitoring of one or more customers of the cloud system; and storing network traffic data of the one or more customers based on the inline monitoring. The network traffic data can include transactions between users and destinations, wherein temporal correlation is persisted between the users and destinations with the network traffic data. The utilizing can include utilizing the synthetic data to simulate a customer cloud environment, wherein the simulated customer cloud environment is utilized to test cybersecurity monitoring and protection policy. The steps can further include providing a User Interface (UI) adapted to allow users to upload one or more sets of real data for generating synthetic data therefrom. The generating can further include anonymizing sensitive characteristics of the real data, wherein the sensitive characteristics includes any of user names and destination names. The set of data can be any of data from public repositories, log data collected during inline monitoring of cloud customers, data collected from one or more third party cloud providers, and data collected from computing devices. The set of real data can include data from public repositories, wherein the steps further include selecting data from the set of real data based on unique file identifiers; and generating synthetic data based on the selected data. The synthetic data can include more data points than the received set of data.

§ 8.0 Conclusion

It will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including software and/or firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," "a circuit configured to," "one or more circuits configured to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer-readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a Read-Only Memory (ROM), a Programmable Read-Only Memory (PROM), an Erasable Programmable Read-Only Memory (EPROM), an Electrically Erasable Programmable Read-Only Memory (EEPROM), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims. Further, the various elements, operations, steps, methods, processes, algorithms, functions, techniques, modules, circuits, etc. described herein contemplate use in any and all combinations with one another, including individually as well as combinations of less than all of the various elements, operations, steps, methods, processes, algorithms, functions, techniques, modules, circuits, etc.

What is claimed is:

1. A method comprising steps of:
receiving a set of real network traffic data associated with monitored transactions between users and destinations in a customer cloud environment;
generating synthetic data from the received set of real network traffic data based on learned transaction patterns, including temporal correlations indicating sequences in which the monitored transactions occurred, wherein sensitive characteristics including at least user identifiers and destination identifiers in the synthetic data are anonymized; and
utilizing the synthetic data for simulating transactions in a simulated customer cloud environment to test cybersecurity monitoring and protection policies prior to deployment of the cybersecurity monitoring and protection policies in a live production environment.

2. The method of claim 1, wherein the set of real network traffic data includes network traffic data intercepted via a cloud system, and wherein the steps comprise:
performing inline monitoring of one or more customers of the cloud system; and
storing network traffic data of the one or more customers based on the inline monitoring.

3. The method of claim 1, wherein the learned transaction patterns further comprise temporal correlations based on at least one of frequency of transactions, regularity intervals, or probabilities of transitions between specific user-destination paris.

4. The method of claim 1, wherein the testing cybersecurity monitoring and protection policies includes evaluating effectiveness of at least one of data loss prevention (DLP), zero-trust network access (ZTNA), firewall policies, sandboxing policies, or malware detection capabilities.

5. The method of claim 1, wherein the steps comprise:
providing a User Interface (UI) adapted to allow users to upload one or more sets of real data for generating synthetic data therefrom.

6. The method of claim 1, wherein the anonymizing sensitive characteristics comprises:
replacing sensitive identifiers with randomly-generated identifiers configured to maintain transaction relationships without revealing original user or destination identities.

7. The method of claim 6, wherein the sensitive characteristics includes any of user names, destination names, and IP addresses.

8. The method of claim 1, wherein the set of data is any of data from public repositories, log data collected during inline monitoring of cloud customers, data collected from one or more third party cloud providers, and data collected from computing devices.

9. The method of claim 8, wherein the set of real network traffic data includes data from public repositories, and wherein the steps further comprise:
selecting data from the set of real network traffic data based on unique identifiers; and
generating synthetic data based on the selected data.

10. The method of claim 1, wherein the synthetic data includes more data points than the received set of data.

11. A non-transitory computer-readable medium comprising instructions that, when executed, cause one or more processors to perform steps of:
receiving a set of real network traffic data associated with monitored transactions between users and destinations in a customer cloud environment;
generating synthetic data from the received set of real network traffic data based on learned transaction patterns, including temporal correlations indicating sequences in which the monitored transactions occurred, wherein sensitive characteristics including at least user identifiers and destination identifiers in the synthetic data are anonymized; and
utilizing the synthetic data for simulating transactions in a simulated customer cloud environment to test cybersecurity monitoring and protection policies prior to deployment of the cybersecurity monitoring and pro-
tection policies in a live production environment.

12. The non-transitory computer-readable medium of
claim 11, wherein the set of real network traffic data includes
network traffic data intercepted via a cloud system, and
wherein the steps comprise:

performing inline monitoring of one or more customers of
the cloud system; and storing network traffic data of the one or more customers
based on the inline monitoring.

13. The non-transitory computer-readable medium of
claim 11, wherein the learned transaction patterns further
comprise temporal correlations based on at least one of
frequency of transactions, regularity intervals, or probabili-
ties of transitions between specific user-destination pairs.

14. The non-transitory computer-readable medium of
claim 11, wherein the testing cybersecurity monitoring and
protection policies includes elevating effectiveness of at
least one of data loss prevention (DLP), zero-trust network
access (ZTNA), firewall policies, sandboxing policies, or
malware detection capabilities.

15. The non-transitory computer-readable medium of
claim 11, wherein the steps comprise:

providing a User Interface (UI) adapted to allow users to
upload one or more sets of real data for generating
synthetic data therefrom.

16. The non-transitory computer-readable medium of
claim 11, wherein anonymizing sensitive characteristics
comprises:

replacing sensitive identifiers with randomly-generated
identifiers configured to maintain transaction relation-
ships without revealing original user or destination
identities.

17. The non-transitory computer-readable medium of
claim 16, wherein the sensitive characteristics includes any
of user names, destination names, and IP addresses.

18. The non-transitory computer-readable medium of
claim 11, wherein the set of data is any of data from public
repositories, log data collected during inline monitoring of
cloud customers, data collected from one or more third party
cloud providers, and data collected from computing devices.

19. The non-transitory computer-readable medium of
claim 18, wherein the set of real network traffic data includes
data from public repositories, and wherein the steps further
comprise:

selecting data from the set of real network traffic data
based on unique identifiers; and generating synthetic data based on the selected data.

20. The non-transitory computer-readable medium of
claim 11, wherein the synthetic data includes more data
points than the received set of data.

* * * * *